US009249043B2

(12) United States Patent
Citti et al.

(10) Patent No.: US 9,249,043 B2
(45) Date of Patent: Feb. 2, 2016

(54) REFRACTORY OBJECT AND PROCESS OF FORMING A GLASS SHEET USING THE REFRACTORY OBJECT

(71) Applicants: Olivier Citti, Wellesley, MA (US); Julien P. Fourcade, Shrewsbury, MA (US); Andrea L. Kazmierczak, Marlborough, MA (US)

(72) Inventors: Olivier Citti, Wellesley, MA (US); Julien P. Fourcade, Shrewsbury, MA (US); Andrea L. Kazmierczak, Marlborough, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 44 days.

(21) Appl. No.: 13/738,988

(22) Filed: Jan. 10, 2013

(65) Prior Publication Data

US 2013/0217563 A1     Aug. 22, 2013

Related U.S. Application Data

(60) Provisional application No. 61/585,618, filed on Jan. 11, 2012.

(51) Int. Cl.
*C04B 35/101* (2006.01)
*C03B 17/06* (2006.01)
(Continued)

(52) U.S. Cl.
CPC ........... *C03B 17/064* (2013.01); *C04B 35/1015* (2013.01); *C04B 35/111* (2013.01);
(Continued)

(58) Field of Classification Search
CPC .... C04B 35/1015; C04B 35/18; C03B 17/064

USPC .......................... 501/105, 128, 127
See application file for complete search history.

(56) References Cited

U.S. PATENT DOCUMENTS

| 3,378,385 A | 4/1968 | McCreight et al. |
| 3,519,448 A | 7/1970 | Alper et al. |

(Continued)

FOREIGN PATENT DOCUMENTS

| CN | 1210838 A | 3/1999 |
| CN | 1835897 A | 9/2006 |

(Continued)

OTHER PUBLICATIONS

Trushkova et al., "Glass for Ion-Exchange Strengthening", Plenum Publishing Company (1982), UDC 666.1.053.65, <http://resources.metapress.com/pdf-preview.axd?code=w1142mnnt5u61410&size=largest>, translated from Steklo i Keramika, No. 2, p. 13, dated Feb. 1982, 1 page.

(Continued)

*Primary Examiner* — Karl Group
(74) *Attorney, Agent, or Firm* — Abel Law Group, LLP; Adam Keser

(57) ABSTRACT

A refractory object can include at least approximately 10 wt % $Al_2O_3$ and at least approximately 1 wt % $SiO_2$. In an embodiment, the refractory object can include an additive. In a particular embodiment, the additive can include $TiO_2$, $Y_2O_3$, SrO, BaO, CaO, $Ta_2O_5$, $Fe_2O_3$, ZnO, or MgO. The refractory object can include at least approximately 3 wt % of the additive. In an additional embodiment, the refractory object can include no greater than approximately 8 wt % of the additive. In a further embodiment, the creep rate of the refractory object can be at least approximately $1 \times 10^{-6}$ $h^{-1}$. In another embodiment, the creep rate of the refractory object can be no greater than approximately $5 \times 10^{-5}$ $h^{-1}$. In an illustrative embodiment, the refractory object can include a glass overflow trough or a forming block.

16 Claims, 3 Drawing Sheets

(51) Int. Cl.
  *C04B 35/111* (2006.01)
  *C04B 35/117* (2006.01)
  *C04B 35/626* (2006.01)
(52) U.S. Cl.
  CPC ......... *C04B35/117* (2013.01); *C04B 35/62685* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3225* (2013.01); *C04B 2235/3232* (2013.01); *C04B 2235/3236* (2013.01); *C04B 2235/3244* (2013.01); *C04B 2235/3251* (2013.01); *C04B 2235/3272* (2013.01); *C04B 2235/3284* (2013.01); *C04B 2235/349* (2013.01); *C04B 2235/3418* (2013.01); *C04B 2235/3427* (2013.01); *C04B 2235/3463* (2013.01); *C04B 2235/604* (2013.01); *C04B 2235/6027* (2013.01); *C04B 2235/72* (2013.01); *C04B 2235/77* (2013.01); *C04B 2235/785* (2013.01); *C04B 2235/80* (2013.01); *C04B 2235/95* (2013.01); *C04B 2235/96* (2013.01)

(56) References Cited

U.S. PATENT DOCUMENTS

| | | | |
|---|---|---|---|
| 3,652,307 | A | 3/1972 | Bakker |
| 3,808,013 | A | 4/1974 | Manigault |
| 3,844,803 | A | 10/1974 | Blanke et al. |
| 3,879,210 | A | 4/1975 | LaBar |
| 3,953,563 | A | 4/1976 | Kihlstedt et al. |
| 4,018,965 | A | 4/1977 | Kerko et al. |
| 4,093,470 | A | 6/1978 | Cherry |
| 4,117,055 | A | 9/1978 | Alexanderson |
| 4,290,814 | A | 9/1981 | Pavlica et al. |
| 4,595,665 | A | 6/1986 | Takayama et al. |
| 4,735,926 | A | 4/1988 | Ando et al. |
| 5,061,526 | A | 10/1991 | Robyn et al. |
| 5,076,815 | A | 12/1991 | Kunz et al. |
| 5,137,853 | A | 8/1992 | Ichikawa et al. |
| 5,322,826 | A | 6/1994 | Becker et al. |
| 5,326,512 | A | 7/1994 | Stillwagon et al. |
| 5,403,795 | A | 4/1995 | Koyama et al. |
| 5,733,830 | A | 3/1998 | Endo et al. |
| 5,795,363 | A | 8/1998 | Pecoraro et al. |
| 5,830,819 | A | 11/1998 | Shikata et al. |
| 5,856,254 | A | 1/1999 | Feige et al. |
| 6,054,186 | A | 4/2000 | Bonsall, III |
| 6,077,801 | A | 6/2000 | Zanoli et al. |
| 6,117,807 | A | 9/2000 | Virkar et al. |
| 6,143,678 | A * | 11/2000 | Yamamoto et al. .......... 501/128 |
| 6,158,248 | A * | 12/2000 | Beppu ..................... 65/374.13 |
| 6,159,885 | A | 12/2000 | Mizuno et al. |
| 6,362,120 | B1 | 3/2002 | Fukushima |
| 6,383,963 | B1 | 5/2002 | Yamamoto et al. |
| 6,812,177 | B2 * | 11/2004 | Ishino .......................... 501/127 |
| 7,148,167 | B2 * | 12/2006 | Shikata et al. ................. 501/105 |
| 7,335,617 | B2 | 2/2008 | Boussant-Roux et al. |
| 7,648,732 | B2 | 1/2010 | Ott et al. |
| 7,767,292 | B2 | 8/2010 | Djuricic et al. |
| 7,939,458 | B2 | 5/2011 | Nakamura et al. |
| 8,092,928 | B2 | 1/2012 | Schofalvi et al. |
| 8,138,109 | B2 | 3/2012 | Takenami et al. |
| 8,187,990 | B2 | 5/2012 | Avedikian et al. |
| 2001/0019992 | A1 | 9/2001 | Gaubil et al. |
| 2002/0103070 | A1 | 8/2002 | Toshihiro |
| 2002/0172871 | A1 | 11/2002 | Schucker |
| 2003/0078156 | A1 | 4/2003 | Lowden |
| 2003/0109372 | A1 | 6/2003 | Hasegawa et al. |
| 2003/0110804 | A1 | 6/2003 | Fenn et al. |
| 2005/0186469 | A1 | 8/2005 | De Jonghe et al. |
| 2006/0293162 | A1 | 12/2006 | Ellison |
| 2007/0015655 | A1* | 1/2007 | Avedikian et al. .......... 501/128 |
| 2007/0154762 | A1 | 7/2007 | Schucker |
| 2007/0203013 | A1* | 8/2007 | Harmuth ..................... 501/133 |
| 2008/0047300 | A1 | 2/2008 | Rhoads |
| 2008/0269042 | A1 | 10/2008 | Carty |
| 2009/0062106 | A1 | 3/2009 | Avedikian et al. |
| 2009/0131241 | A1 | 5/2009 | Godard et al. |
| 2009/0233784 | A1 | 9/2009 | Schofalvi et al. |
| 2010/0068492 | A1 | 3/2010 | Boussant-Roux et al. |
| 2010/0084016 | A1 | 4/2010 | Aitken et al. |
| 2010/0087307 | A1 | 4/2010 | Murata et al. |
| 2010/0089098 | A1 | 4/2010 | Citti et al. |
| 2010/0151232 | A1 | 6/2010 | Cabodi et al. |
| 2010/0159226 | A1 | 6/2010 | Suchanek et al. |
| 2010/0179051 | A1 | 7/2010 | Citti et al. |
| 2010/0212359 | A1 | 8/2010 | Godard et al. |
| 2010/0251774 | A1 | 10/2010 | Peterson |
| 2010/0298109 | A1 | 11/2010 | Takenami et al. |
| 2011/0021340 | A1 | 1/2011 | Schofalvi et al. |
| 2011/0236743 | A1 | 9/2011 | Kumar et al. |
| 2011/0251042 | A1 | 10/2011 | Araki et al. |
| 2011/0283742 | A1 | 11/2011 | Alasia |
| 2012/0006059 | A1 | 1/2012 | Dejneka et al. |
| 2012/0006069 | A1 | 1/2012 | Kim et al. |
| 2012/0096822 | A1* | 4/2012 | Raffy .............................. 55/523 |
| 2012/0164540 | A1 | 6/2012 | Park et al. |
| 2012/0180528 | A1 | 7/2012 | Ketcham et al. |
| 2012/0227445 | A1 | 9/2012 | Citti et al. |
| 2012/0260696 | A1 | 10/2012 | Citti et al. |
| 2012/0263929 | A1 | 10/2012 | Citti |
| 2013/0217563 | A1 | 8/2013 | Citti et al. |

FOREIGN PATENT DOCUMENTS

| | | |
|---|---|---|
| CN | 101124173 A | 2/2008 |
| CN | 101367665 A | 2/2009 |
| CN | 101687711 A | 3/2010 |
| CN | 101774749 A | 7/2010 |
| DE | 3029784 A1 | 2/1981 |
| DE | 3725170 | 2/1989 |
| DE | 112006003321 A5 | 10/2008 |
| EP | 0010834 A1 | 5/1980 |
| EP | 0701979 A1 | 3/1996 |
| EP | 0818259 A1 | 1/1998 |
| EP | 0850897 A1 | 7/1998 |
| EP | 0887324 A1 | 12/1998 |
| EP | 1288177 A1 | 3/2003 |
| EP | 2407441 A2 | 1/2012 |
| FR | 2392946 | 12/1978 |
| GB | 454599 A | 10/1936 |
| GB | 618248 A | 2/1949 |
| GB | 960384 A | 6/1964 |
| GB | 1072536 A | 6/1967 |
| GB | 1244895 A | 6/1971 |
| GB | 1531167 A | 11/1978 |
| GB | 2262522 A | 6/1993 |
| JP | 52129714 A | 10/1977 |
| JP | 56-69270 A | 6/1981 |
| JP | 56-92177 A | 7/1981 |
| JP | 56092177 * | 7/1981 |
| JP | 60055459 B2 | 12/1985 |
| JP | 2069363 A | 3/1990 |
| JP | 2092871 A | 4/1990 |
| JP | 2225369 A | 9/1990 |
| JP | 03083849 | 4/1991 |
| JP | H04-310570 A | 11/1992 |
| JP | 5301762 A | 11/1993 |
| JP | 06144922 * | 5/1994 |
| JP | H08-048561 A | 2/1996 |
| JP | 08175878 | 7/1996 |
| JP | 9030859 A | 2/1997 |
| JP | 9328357 A | 12/1997 |
| JP | 10218676 | 8/1998 |
| JP | H10-218676 A | 8/1998 |
| JP | 11171639 A | 6/1999 |
| JP | 2942061 B2 | 8/1999 |
| JP | 11343174 * | 12/1999 |
| JP | 2000111024 * | 4/2000 |
| JP | 2003-081653 A | 3/2003 |
| JP | 2003137671 A | 5/2003 |

(56) References Cited

FOREIGN PATENT DOCUMENTS

| JP | 3489588 B2 | 1/2004 |
|---|---|---|
| JP | 2004026561 | 1/2004 |
| JP | 2004-203691 A | 7/2004 |
| JP | 2005512926 A | 5/2005 |
| JP | 2007-504088 A | 3/2007 |
| JP | 2007197303 A | 8/2007 |
| JP | 2008-501609 A | 1/2008 |
| JP | 2009-158576 A | 7/2009 |
| JP | 2011088759 A | 5/2011 |
| JP | 2012020925 | 2/2012 |
| RU | 2039025 C1 | 7/1995 |
| RU | 2140964 C1 | 11/1999 |
| SU | 1054331 A1 | 11/1983 |
| SU | 1470731 | 4/1989 |
| SU | 1675279 A1 | 9/1991 |
| SU | 1796601 | 2/1993 |
| TW | 200946467 A | 11/2009 |
| TW | I332487 B | 11/2010 |
| WO | 9908804 A1 | 2/1999 |
| WO | 01-92183 A1 | 12/2001 |
| WO | 2005/023726 A1 | 3/2005 |
| WO | 2006/057669 A1 | 6/2006 |
| WO | 2009/007933 A1 | 1/2009 |
| WO | 2009/020011 A1 | 2/2009 |
| WO | 2009096550 A | 8/2009 |
| WO | 2010071892 A2 | 6/2010 |
| WO | 2010073195 A1 | 7/2010 |
| WO | 2011022639 A2 | 2/2011 |
| WO | 2011055642 A | 5/2011 |
| WO | 2012125507 A3 | 9/2012 |

OTHER PUBLICATIONS

"Standard Test Methods for Apparent Porosity, Water Absorption, Apparent Specific Gravity, and Bulk Density of Burned Refractory Brick and Shapes by Boiling Water", ASTM International, Designation: C20-00, dated 2005, 3 pages.

The International Search Report and the Written Opinion received from the International Searching Authority (ISA/KR) for International Application No. PCT/US2012/031689 dated Oct. 25, 2012, 14 pages.

The International Search Report and the Written Opinion received from the International Searching Authority (ISA/KR) for International Application No. PCT/US2012/028633, dated Oct. 18, 2012, 14 pages.

The International Search Report and the Written Opinion received from the International Searching Authority (ISA/KR) for International Application No. PCT/US2013/021086, dated Jun. 17, 2013, 15 pages.

Yujuan, Zhang, "The Effects of Ta2O5 and MgO Additives on Microstructure and Mechanical Properties of Ultra-pure Alumina Ceramics," Journal of Wuhan Institute of Building Materials, Dec. 31, 1983, Issue 1, pp. 27-42.

"The Saint=Gobain SEFPRO Unshaped Product Range 1991-2009", Jan. 1, 2009, pp. 1-7, XP002731397 <www.sefpro.com/uploaded files/>.

Davis Jr., et al., "What You Should Know About Fusion-Cast Refractories", Glass Industry, Jan. 1, 1989, vol. 70, No. 9, pp. 14-16.

Wolfgang Schulle, "Feuerfeste Werkstoffe", Deutscher Verlag fur Grundstoffindustrie, Liebzig, Jan. 1, 1990, 2 pages (XP-002730933).

G. Routschka, et al., "Praxisbuch Feuerfeste Werkstoffe, 5., Auflage," Vulkan Verlag, Esse, DE, Jan. 1, 2011, 31 pages (XP-002730934).

A.A. Litvakovsky, "Fused Cast Refractories", Moscow, Gosstroyizdat, 1959, (I), p. 30-31, Monofrax MH and Monfrax H.

International Search Report from PCT/US2012/033409 mailed Mar. 4, 2013, 1 page.

Felsche, J., "The Alkali Problem in the Crystal Structure of Beta Alumina", Massachusetts Institute of Technology, Cambridge, Massachusetts, Received Jan. 22, 1968, 7 pages.

"NIST Property Data Summaries, ""Beta Alumina (Al2O3)""", Date Created: Feb. 8, 2001; Last Updated: Feb. 8, 2001; 2 pages<http://www.ceramics.nist.gov/srd/summary/ftgbetal.htm>".

Search Results, 7 pages.

\* cited by examiner

REFRACTORY OBJECT AND PROCESS OF FORMING A GLASS SHEET USING THE REFRACTORY OBJECT

This application claims priority under 35 U.S.C. §119(e) to U.S. Patent Application No. 61/585,618 entitled "REFRACTORY OBJECT AND PROCESS OF FORMING A GLASS SHEET USING THE REFRACTORY OBJECT," by Citti et al., filed Jan. 11, 2012, which is assigned to the current assignee hereof.

FIELD OF THE DISCLOSURE

This disclosure is directed to refractory objects including glass overflow troughs and glass forming blocks, and a process of using the refractory object.

BACKGROUND

Alkali alumino-silicate glasses are being used in applications where mechanical performance is important. These glasses can be formed using a fusion draw process. In a fusion draw process, liquid glass flows over one or more lips of a glass overflow trough and the liquid glass fuses at the bottom of the glass overflow trough to form a glass sheet. The glass overflow trough can be made from a forming block including an aluminum material. The size and quality of a glass sheet may be limited by physical properties of the glass overflow trough used to form the glass sheet. In addition, the lifetime of a glass overflow trough can be affected by its physical properties. Further improvement of refractory blocks used to make forming blocks and glass overflow troughs is desired.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
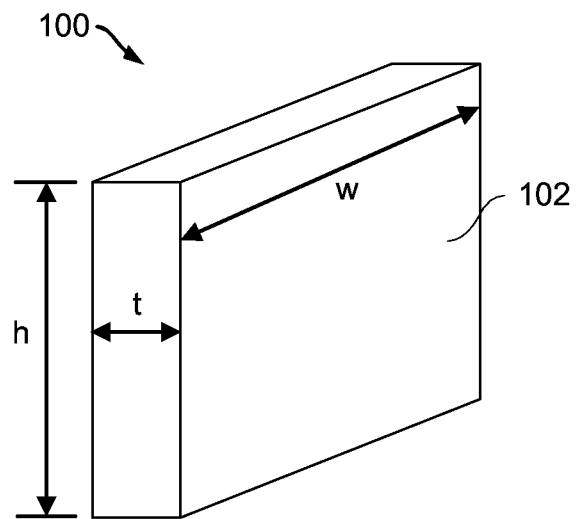
FIG. 1 is a diagram illustrating a particular embodiment of a refractory object.

FIG. 1 is a diagram illustrating a particular embodiment of a refractory object 100. The refractory object 100 can be a refractory block 102 having a rectilinear shape with a thickness (t), a width (w), and a height (h). In an embodiment, any of the dimensions t, w, or h can be at least approximately 0.02 m, at least approximately 0.05 m, at least approximately 0.11 m, at least approximately 0.5 m, at least approximately 1.1 m, at least approximately 2.0 m, at least approximately 4.0 m, or more. In the embodiment as illustrated in FIG. 1, the refractory block 102 can be a forming block from which a glass overflow trough can be formed. A forming block as used herein refers to a sintered ceramic material that can be shaped to provide a glass overflow trough.

The refractory block 102 can be formed from a number of starting materials. In an embodiment, the refractory block 102 can be formed using one or more metal oxides, one or more additives, one or more additional materials, or a combination thereof. In a particular embodiment, a metal oxide used as starting material for the refractory block 102 can include $Al_2O_3$ and $SiO_2$. In an embodiment, the $Al_2O_3$ can be provided as a powder. The $Al_2O_3$ powder can be in the form of particles having an averaged particle size no greater than approximately 100 micrometers, an averaged particle size no greater than approximately 30 micrometers, an averaged particle size no greater than approximately 20 micrometers, or an averaged particle size no greater than approximately 15 micrometers. In another embodiment, the averaged particle size is at least approximately 0.5 micrometers, at least approximately 1.0 micrometers, or at least approximately 5.0 micrometers.

In an embodiment, a combination of $Al_2O_3$ powders having different particle sizes can be used. For example, the number of different particle sized $Al_2O_3$ powders can be two, three, four, or more. In a particular embodiment, $Al_2O_3$ powders having two different particle sizes are used. In a more particular embodiment, one of the $Al_2O_3$ powders can have an averaged particle size that is less than approximately 50%, less than approximately 40%, or less than approximately 30% of the averaged particle size of the other $Al_2O_3$ powder. To illustrate, one of the $Al_2O_3$ powders can have a nominal particle size of 2 micrometers, and the other $Al_2O_3$ powder can have a nominal particle size of 10 micrometers. The $Al_2O_3$ powders of different particle sizes can be mixed in any ratio. For example, $Al_2O_3$ powders having two different particle sizes can be mixed in a ratio of approximately 1:99, approximately 2:98, approximately 3:97, approximately 10:90, approximately 20:80, approximately 50:50, approximately 80:20, approximately 90:10, approximately 97:3, approximately 98:2, or approximately 99:1. Likewise, mixture of $Al_2O_3$ powders having three or more different sizes can be prepared in a particular ratio.

In an embodiment, $Al_2O_3$ can be provided as reactive $Al_2O_3$, non-reactive $Al_2O_3$, or any combination thereof. Reactive $Al_2O_3$ can help to increase the density and reduce the porosity of the refractory object 100. As used herein, "reactive $Al_2O_3$" is intended to mean that the particular $Al_2O_3$ powder has a surface area of at least two square meters per gram ($\geq 2$ m$^2$/g), and, "non-reactive $Al_2O_3$" is intended to mean that the particular $Al_2O_3$ powder has a surface area less than two square meters per gram (<2 m$^2$/g). In an embodiment, the amount of reactive $Al_2O_3$, as a fraction of total $Al_2O_3$ powder used to form the refractory object 100 can include at least approximately 1% and may be up to 100% of the total $Al_2O_3$ powder used. A combination of reactive $Al_2O_3$ and non-reactive $Al_2O_3$ powders can be used. In a particular embodiment, at least approximately 2%, at least approximately 5%, at least approximately 16%, at least approximately 25%, or at least approximately 50% of the $Al_2O_3$ used in forming the refractory object 100 can be provided as reactive $Al_2O_3$. In another embodiment, no greater than approximately 95%, no greater than approximately 90%, no greater than approximately 75%, no greater than approximately 60%, or no greater than approximately 50% of the $Al_2O_3$ used in forming the refractory object 100 is provided as reactive $Al_2O_3$.

In another embodiment, at least a portion of the $Al_2O_3$ can be provided as mullite. In a particular embodiment, the mullite can include at least approximately 62% by weight (hereinafter "wt %") $Al_2O_3$, at least approximately 66 wt % $Al_2O_3$, or at least approximately 71 wt % $Al_2O_3$. Additionally, the mullite may include no greater than approximately 78 wt % $Al_2O_3$, no greater than approximately 74 wt % $Al_2O_3$, or no greater than approximately 68 wt % $Al_2O_3$.

At least a portion of the $SiO_2$ can be provided as mullite, amorphous $SiO_2$, crystalline $SiO_2$, talc, glass frit, or any combination thereof. In an embodiment, the crystalline $SiO_2$ can be provided as quartz, tridymite, cristobalite, or any combination thereof. In an additional embodiment, a glass frit used to provide $SiO_2$ to the refractory object 100 can have $SiO_2$ content of at least approximately 55 wt % and be from an alkali free glass. In a further embodiment, mullite used to produce the refractory object 100 can include at least approximately 22 wt % $SiO_2$, at least approximately 24 wt % $SiO_2$, or at least approximately 26 wt % $SiO_2$. In another embodiment, the mullite may also include no greater than approximately 24 wt % $SiO_2$, no greater than approximately 27 wt % $SiO_2$, or no greater than approximately 29 wt % $SiO_2$. In an additional embodiment, talc used to produce the refractory object 100 can include at least approximately 36 wt % $SiO_2$, at least approximately 44 wt % $SiO_2$, or at least approximately 52 wt % $SiO_2$. In another embodiment, the talc may include no greater than approximately 54 wt % $SiO_2$, no greater than approximately 61 wt % $SiO_2$, or no greater than approximately 66 wt % $SiO_2$.

The starting materials for the refractory object 100 can also include Zr. In a particular embodiment, the Zr can be provided as an oxide, such as $ZrO_2$. In another embodiment, the Zr can be provided as $ZrSiO_4$. In addition, the starting materials can include one or more additives. The additives can be a molecular compound including Ti, Y, Sr, Ba, Ca, Ta, Fe, Zn, Mg, or any combination thereof. In an embodiment, the additives can be provided as an oxide, a carbide, a carbonate, a nitrate, a sulfate, a halide, a phosphate, or any combination thereof. In addition, one or more additives can be provided as an oxide in combination with a boride, carbide, carbonate, nitrate, halide, phosphate, sulfate, or the like. The one or more additives can have an oxidation state, such as $M^{2+}$, $M^{3+}$, $M^{4+}$, $M^{5+}$, or any combination thereof, where M is Ti, Y, Sr, Ba, Ca, Ta, Fe, Zn, or Mg.

In an embodiment, the additives can be provided in a substantially pure form with trace amounts of impurities. In another embodiment, one or more additives can be provided as a compound. For example, MgO and $TiO_2$ can be provided as an $MgTiO_3$ compound.

In a particular embodiment, at least a portion of the one or more additives can be provided as a powder. In a more particular embodiment, the powder may be in the form of particles having an averaged particle size no greater than approximately 30 micrometers, no greater than approximately 20 micrometers, or no greater than approximately 15 micrometers. In another embodiment, the averaged particle size is at least approximately 0.1 micrometers, at least approximately 0.5 micrometers, or at least approximately 1 micrometer.

In an embodiment, at least a portion of a particular additive can be a sintering agent. In a particular example, the sintering agent can help to reduce porosity by lowering a melting temperature of $SiO_2$ used to make the refractory block 102 and allowing $SiO_2$ to be disposed within pores of the refractory block 102. Reducing porosity of the refractory object can help to improve resistance to corrosion if the refractory object is later exposed to a corrosive environment. An exemplary sintering agent can include Ta, Ti, Fe, Mg, Zn, another suitable sintering agent, or any combination thereof. In an illustrative embodiment, additives provided as sintering agents can be provided as oxides.

In another embodiment, at least a portion of a particular additive can be added to react with $SiO_2$ to prevent Al from reacting with the $SiO_2$. In particular, Mg, Ca, Ba, Sr, Y, or any combination thereof, can be added to react with $SiO_2$ rather than Al that is provided as a starting material for the refractory block 100. In one embodiment, an additive provided to substitute for Al can be provided as an oxide. In another embodiment, an additive provided to substitute for Al can be provided as a silicate, such as mullite ($Al_6Si_2O_{13}$), talc ($Mg_3SiO_{10}(OH)_2$), yttrium silicate ($Y_2Si_2O_7$) or any combination thereof. In a further embodiment, an Al substitute additive can be provided as an aluminosilicate, such as cordierite ($Mg_2Al_4Si_5O_{18}$), anorthite ($CaN_2Si_2O_8$), or any combination thereof. In an additional embodiment, the Al replacement additive can be provided as an aluminate, such as yttrium aluminum garnet ($Y_3Al_5O_{12}$), spinel ($MgAl_2O_4$), or any combination thereof.

Additional material that can be used to form the refractory block 102 can include a binder, a solvent, a dispersant, a thickener, a deflocculant, another suitable ingredient, or any combination thereof. In an embodiment, the additional material can include non-metallic compounds. In another embodiment, the additional material can include an organic compound, water, or the like.

The starting materials and any additional materials can be combined and shaped to form a green body having a particular shape. Shaping can be performed using a technique, such as slip casting, isostatic pressing, or any combination thereof. The shape can be rectilinear, cylindrical, spherical, ellipsoidal or nearly any other shape. In a particular embodiment, the green body can be in the shape of a rectilinear block referred to as a blank that can subsequently be machined to form a glass overflow trough. In another embodiment, the green body can be structured in such fashion to more closely match the final refractory object to reduce the extent of any further machine processing. For example, when the refractory object 100 includes a glass overflow trough, the shape of the green body may more closely resemble the glass overflow trough to reduce the amount of subsequent machining and ceramic material that would be discarded. More particularly, the green body can have a rectilinear portion adjacent to a tapered portion. The rectilinear portion has a tapered region corresponding to a region where a glass overflow trough will be formed. In another embodiment, the green body can be shaped to have the glass overflow trough adjacent to the tapered portion After the green body is formed, the green body is heated in an oven, heater, furnace, or the like to form the refractory block 102 that includes a sintered ceramic material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. Following the initial heating, the sintering can be performed at a temperature in a range of approximately 1400° C. to 1700° C. for a time period in a range of approximately 10 hours to approximately 100 hours to form the refractory block 102.

The shape of the refractory block 102 generally corresponds to the shape of the green body. Thus, the refractory block 102 may have any of the shapes as previously described with respect to the green body. During sintering, some shrinkage may occur, and the refractory block 102 may be smaller than the green body.

A sintered object, such as the refractory block 102, can be distinguished from objects that have been formed by fuse-casting. In particular, objects that have been formed by fuse-casting often include a highly abundant intergranular glass phase that fills the network of crystallized grains of the object. In contrast, a sintered object can include phases that are formed at the grain boundaries with another phase. Due to differences in their microstructures, the problems encountered by sintered objects and by fused-cast objects in their respective applications and the technical solutions adopted for solving them are generally different. Furthermore, due to the differences between manufacturing an object by sintering and manufacturing an object by fuse-casting, a composition developed for a fused-cast product may not be used a priori for manufacturing a sintered product, In an embodiment, the refractory block 102 can include at least approximately 20 wt % $Al_2O_3$, at least approximately 50 wt % $Al_2O_3$, at least approximately 70 wt % $Al_2O_3$, at least approximately 85 wt % $Al_2O_3$, at least approximately 90 wt % $Al_2O_3$, or at least approximately 92 wt % $Al_2O_3$. In another embodiment, the refractory block 102 may include no greater than approximately 95 wt % $Al_2O_3$, no greater than approximately 94 wt % $Al_2O_3$, no greater than approximately 93 wt % $Al_2O_3$, or no greater than approximately 90 wt % $Al_2O_3$. In an additional embodiment, the refractory block 102 can include at least approximately 1.1 wt % $SiO_2$, at least approximately 1.5 wt % $SiO_2$, at least approximately 2.1 wt % $SiO_2$, or at least approximately 2.7 wt % $SiO_2$. In a further embodiment, the refractory block 102 may include no greater than approximately 7 wt % $SiO_2$, no greater than approximately 6 wt % $SiO_2$, or no greater than approximately 4 wt % $SiO_2$.

The refractory block 102 can include an additive. In an embodiment, the additive can include $TiO_2$, $Y_2O_3$, SrO, BaO, CaO, $Ta_2O_5$, $Fe_2O_3$, ZnO, or MgO. In a particular embodiment, the refractory block 102 can include at least approximately 0.2 wt % of the additive. In an additional embodiment, the refractory block 102 may include no greater than approximately 8 wt % of the additive. In a more particular embodiment, the refractory block 102 can include at least approximately 0.2 wt % of the additive, at least approximately 0.4 wt % of the additive, or at least approximately 0.6 wt % of the additive. In another embodiment, the refractory block 102 may include no greater than approximately 8 wt % of the additive, no greater than approximately 7 wt % of the additive, or no greater than approximately 6 wt % of the additive.

In an embodiment, the additive is a particular additive of a plurality of additives of the refractory block 102. In a particular embodiment, the refractory block 102 comprises at least approximately 0.3 wt % of each additive of the plurality of additives, at least approximately 0.8 wt % of each additive of the plurality of additives, at least 1.6 wt % of each additive of the plurality of additives, or at least 2.5 wt % of each additive of the plurality of additives. In a particular embodiment, the refractory block 102 comprises at least approximately 5 wt % of the particular additive. Additionally, a total content of the plurality of additives in the refractory block 102 is at least approximately 1.5 wt %, at least approximately 3 wt %, at least approximately 5 wt %, or at least approximately 7 wt %. Further, a total content of the plurality of additives in the refractory block 102 may be no greater than approximately 14 wt %, no greater than approximately 12 wt %, or no greater than approximately 10 wt %.

In an embodiment, the refractory block 102 includes $TiO_2$. In a particular embodiment, the refractory object 102 includes at least approximately 0.2 wt % $TiO_2$, at least approximately 0.4 wt % $TiO_2$, or at least 0.6 wt % $TiO_2$. In another embodiment, the refractory block 102 includes no greater than approximately 4.0 wt % $TiO_2$, no greater than approximately 3.0 wt % $TiO_2$, or no greater than approximately 2.0 wt % $TiO_2$.

The refractory block 102 can also include MgO as an additive. In an embodiment, the refractory block 102 includes at least approximately 0.2 wt % MgO, at least approximately 0.4 wt % MgO, or at least approximately 0.6 wt % MgO. In another embodiment, the refractory block 102 may include no greater than approximately 4.5 wt % MgO, no greater than approximately 3.5 wt % MgO, or no greater than approximately 2.5 wt % MgO. In still another embodiment, the refractory block 102 can include CaO. In particular, the refractory block 102 can include at least approximately 0.2 wt % CaO, at least approximately 0.5 wt % CaO, or at least approximately 0.7 wt % CaO.

In an embodiment, the refractory block 102 includes $Fe_2O_3$ as an additive. In a particular embodiment, the refractory block 102 includes at least approximately 0.2 wt % $Fe_2O_3$, at least approximately 0.7 wt % $Fe_2O_3$, or at least approximately 0.9 wt % $Fe_2O_3$. In another embodiment, the refractory block 102 includes $Ta_2O_5$ as an additive. In an illustrative embodiment, the refractory block 102 includes at least approximately 0.2 wt % $Ta_2O_5$, at least approximately 0.4 wt % $Ta_2O_5$, or at least approximately 0.6 wt % $Ta_2O_5$. In an additional embodiment, the refractory block 102 may include no greater than approximately 2.0 wt % $Ta_2O_5$, no greater than approximately 1.1 wt % $Ta_2O_5$, or no greater than approximately 0.7 wt % $Ta_2O_5$.

The refractory block 102 can also include $Y_2O_3$ as an additive. In an embodiment, the refractory block 102 can include at least approximately 1 wt % $Y_2O_3$, at least approximately 2 wt % $Y_2O_3$, or at least approximately 3 wt % $Y_2O_3$. In an additional embodiment, the refractory block 102 may include no greater than approximately 8 wt % $Y_2O_3$, no greater than approximately 7 wt % $Y_2O_3$, or no greater than approximately 6 wt % $Y_2O_3$.

In an embodiment, the refractory block 102 can include a single additive or a particular combination of additives. In a particular embodiment, the refractory block 102 can include $TiO_2$ as an only additive of the refractory block 102. In another embodiment, the refractory block 102 can include $TiO_2$ and MgO as additives. In a further embodiment, the refractory block can include $TiO_2$, $Fe_2O_3$, and $Ta_2O_5$. The refractory block 102 can also include $Ta_2O_5$ as an only additive or the refractory block 102 can include $Y_2O_3$ as an only additive.

In a particular embodiment, the refractory block 102 includes $ZrO_2$. For example, the refractory block 102 may include no greater than approximately 0.3 wt % $ZrO_2$, no greater than approximately 0.2 wt % $ZrO_2$, no greater than approximately 0.05 wt % $ZrO_2$, or is substantially free of ZrO2. As used herein, the term "substantially free" refers to content of a particular material that is no more than trace amounts, such as no greater than 100 ppm by weight. In another embodiment, the refractory block 102 can include at least 0.03 wt % $ZrO_2$, at least 0.1 wt % $ZrO_2$, or at least 0.25 wt % $ZrO_2$. In a more particular embodiment, the refractory block 102 can include an amount of $Y_2O_3$ that corresponds to the amount of $ZrO_2$ in the refractory block 102. To illustrate, the refractory block 102 can includes at least approximately 0.2 wt % $ZrO_2$ and at least approximately 0.2 wt % $Y_2O_3$. In an additional embodiment, an amount of $Y_2O_3$ of the refractory block 102 can be provided to prevent $ZrO_2$ in the refractory block 102 from changing crystalline states.

Figure 2:
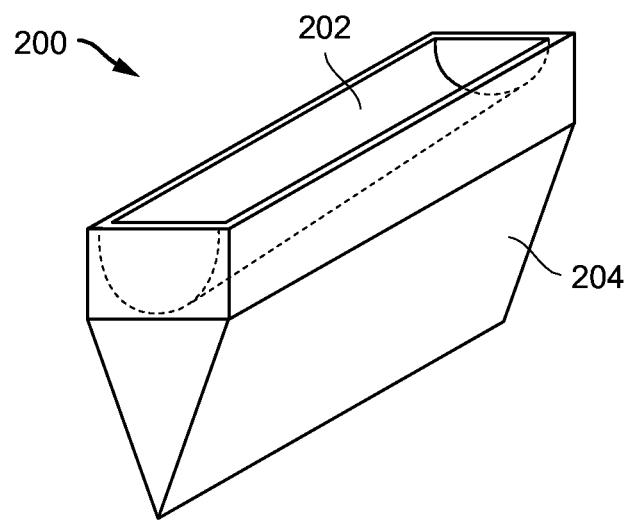
FIG. 2 is a diagram illustrating a particular embodiment of a glass overflow trough formed from a refractory object.
Figure 3:
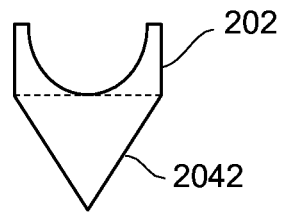
FIG. 3 is a diagram illustrating a particular set of various cross-sectional perspectives of glass overflow troughs.
Figure 3:
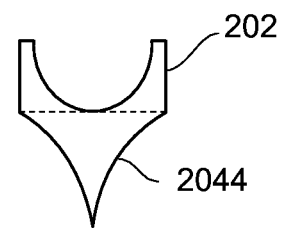
Figure 3:
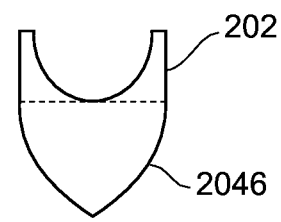

The refractory block 102 can be machined to produce a different shape, a smoother surface, or both. In the illustrative embodiment of FIG. 2, the refractory block 102 can be machined to form a glass overflow trough 200. The glass overflow trough 200, which is also a refractory object, has a body that includes a glass overflow trough portion 202 and a tapered portion 204. The glass overflow trough portion 202 includes a trough that has a depth that decreases along a length of the glass overflow forming block 200. FIG. 3 includes a cross-sectional view of exemplary shapes of the tapered portion 204. More particularly, the tapered portion can include a wedge shape 2042, a concave shape 2044, or a convex shape 2046. Other shapes may used to meet the needs or desires for a particular application.

The refractory block 102 may have one or more physical properties that are particularly suited for providing a glass overflow trough 200 that is used to form glass that includes aluminum, silicon, alkalis (e.g. Na, K), earth alkalis (e.g. Ca, Ba, Sr), or any combination thereof ("Al—Si glass"). In particular, the physical properties of the refractory block 102 can increase the lifetime of a glass overflow trough formed from the refractory block 102 by reducing corrosion. Lower corrosion of the refractory block 102 can help to maintain the mechanical integrity of the refractory block 102. Corrosion of the refractory block 102 can be reduced when the refractory block 102 has at least a particular theoretical density and no greater than a particular apparent porosity. Further, when the refractory block 102 includes a glass overflow trough, lower corrosion may reduce the amount of the material from the glass overflow trough migrating into the glass being formed using the glass overflow trough and allow better control over the composition of the glass sheets formed using the glass overflow trough. Reducing corrosion of the refractory block 102 can also substantially prevent the formation of defects such as cords or knots. Corrosion of the refractory block 102 can decrease when the percentage of the theoretical density is above a particular value and/or when the apparent porosity of the refractory block 102 is above a particular value. Additionally, when the refractory block 102 has a particular theoretical density and no greater than a particular apparent porosity and the refractory block 102 includes a glass overflow trough, an amount of glass material penetrating pores of the refractory block 102 can be reduced. This can also result in reduced defects of the glass sheet being formed.

Further, minimization of creep rate of the refractory block 102 can provide a minimum sag deformation when the refractory block 102 includes a glass overflow trough. Sag deformation as used herein can refer to deformation of the refractory block 102 due to the forces applied from the combined weight of the refractory block 102 and the glass sheets being formed using the refractory block 102. Minimum sag deformation can allow a glass overflow trough to be used to produce glass sheets having thicknesses no greater than a particular amount (e.g. no greater than approximately 1 mm) and having at least a particular length (e.g. at least approximately 2 m).

In an embodiment, the refractory block 102 can have a fracture toughness that is at least approximately 2.1 MPa-m$^{1/2}$, at least approximately 2.5 MPa-m$^{1/2}$, or at least approximately 2.9 MPa-m$^{1/2}$. The fracture toughness of the refractory block 102 can be measured according to an indentation test. In a particular embodiment, the fracture toughness can be measured by an indentation fracture method according to ASTM E384-89 as of the date of filing of this patent application with an applied load of 0.5 kg. Increased fracture toughness of the refractory block 102 can minimize cracks of the refractory block 102 that may form during heating of the refractory block 102.

In another embodiment, a quality of a glass contact interface with respect to the refractory block 102 can be measured. In particular, a variation of the ASTM C621-09 Standard Test Method for Isothermal Corrosion Resistance of Refractories to Molten Glass as of the date of filing this patent application can be used. In an illustrative embodiment, one or more samples having dimensions of 10×10×50 mm$^3$ are prepared. The samples are hung inside an electric box furnace. A platinum crucible is filled with an amount of glass cullets (e.g. 50 g of alkali alumino-silicate glass) and the crucible is then placed into the furnace. The filled crucible and the sample are heated up to a testing temperature (e.g. 1200° C.), while the sample remains hanging above the glass. At the testing temperature the sample is lowered into the molten glass and a bottom portion of the sample is attached to a top fixture of the set up and immersed into the melt a particular distance (e.g. about 30 mm) for about 120 hours at the testing temperature. The sample is then raised outside of the glass at the testing temperature and the sample and crucible are cooled. After cooling, the sample is cut in half along its longest dimension and both halves are polished. The glass-sample interface is observed with a stereomicroscope. The interface can be qualified as "loose" when the sample has dissolved into the glass melt and/or when pieces of the sample fell into the glass melt. A loose interface leads to glass defects such as cords and stones (primary or recrystallized) that negatively impact glass production (i.e. yield and quality). The interface can be qualified as "tight" when there is a clear interface between the glass and the sample with no obvious reaction, in the glass or in the sample. Refractory objects having a tight glass contact performance can be used to produce high quality glass with a good yield.

Furthermore, blistering performance of the refractory block 102 can be measured. In an embodiment, a sample is prepared having dimensions of 5×25×25 mm$^3$. Glass cullets weighing about 5 g are placed on the top surface of the sample. The sample topped with the glass cullets is heated in an electric box furnace up to 1200° C. at a rate of 5 to 10° C./min. The sample with the glass cullets is kept at a temperature of 1200° C. for 16 hours. The sample is then cooled at a rate of about 20° C./min to avoid devitrification of the glass upon cooling. A number of bubbles formed into the glass is observed using a stereomicroscope. The blistering level is reported "high" when a particular number of bubbles is observed, such as at least 20 bubbles. The blistering level is "low" when no bubbles are observed or no greater than a particular number of bubbles are observed in the glass, such as less than 20 bubbles and preferably no greater than 10 bubbles. Blisters often cause glass sheets to be rejected in most glass forming operations and minimization of blistering is desired.

Additionally, a percentage of the theoretical density ("Th.D") of the refractory block 102 can be measured. In an embodiment, the percentage of the theoretical density of the refractory block 102 may be no greater than approximately 98%, no greater than approximately 97%, or no greater than approximately 96%. In another embodiment, the percentage of the theoretical density of the refractory object 102 can be at least approximately 91%, at least approximately 92%, or at least approximately 93%. The theoretical density as referred to herein is the density a sample would have if its porosity (open and closed) was equal to 0. The percentage of theoretical density, also referred to herein as densification, for a given sample can be calculated from the ratio of its density ("D") over its theoretical density as shown in Equation 1:

$$(D/Th.D.) \times 100 = \% \; Th.D. \text{(densification)} \quad \text{(Eq. 1)}$$

When the refractory block 102 includes a number of oxides, the theoretical density of a refractory block 102 can be calculated based on the chemical composition of the mix of oxides included in the refractory block as shown in Equation 2:

$$W_{dry}/[W_{Ox1}/Th.D_{Ox1} + W_{Ox2}/Th.D_{Ox2} + \ldots + W_{Oxn}/Th.D_{Oxn}] = Th.D \quad \text{(Eq. 2)}$$

where, $W_{dry}$, is a dry weight of the mix of oxides, $W_{Ox}$ is a weight of a particular oxide, and $Th.D_{Ox}$ is the theoretical density of a particular oxide.

Additionally, density as referred to herein is the ratio between the measured weight of a sample of a refractory block and its volume without the open porosity. The volume is measured by immersion of the sample into water having a density $d_{Liq}$. This method can be referred to as the immersion density method or Archimedes method and comprises the following steps: (1) samples are vacuumed to eliminate air and adsorbed water from the surface and from open pores (2) samples are immersed in water to fill up open pores (3) the weight of the samples is measured ($W_{imm}$) immersed in water (4) samples are removed from the liquid and the surface is wiped prior to measuring the weight of samples in air this time ($W_{wet}$) (5) samples are dried and their weight is measured ($W_{dry}$). Equations 3 and 4 shown below can be used to calculate the density of the sample.

$$(W_{dry} - W_{imm})/d_{Liq} = V \text{(volume of sample)} \quad \text{(Eq. 3)}$$

$$W_{dry}/V = D \quad \text{(Eq. 4)}$$

Further, the apparent porosity of the refractory block 102 can be measured. In a particular embodiment, the apparent porosity of the refractory block 102 may be no greater than approximately 1.0 vol %, no greater than approximately 0.8 vol %, no greater than approximately 0.5 vol %, or no greater than approximately 0.2 vol %. Open (or apparent) porosity as used herein is the volume of porosity that is accessible (i.e. the volume that can be filled). Apparent porosity is expressed herein as a percentage of total volume as shown by Equation 5, where the volume of the pores ($V_{poro}$) is calculated according to Equation 6:

$$(V_{Poro}/V) \times 100 = \% \; Poro \quad \text{(Eq. 5)}$$

$$(W_{wet} - W_{dry})/d_{Liq} = V_{Poro} \quad \text{(Eq. 6)}$$

A creep rate of the refractory block 102 can also be measured. The creep rate can be a flexural creep rate. The flexural creep rate is a measurement of the rate of deflection of a refractory object in a direction normal to the length of the refractory when the refractory object has been subjected to a predetermined mechanical stress at a predetermined temperature for a predetermined time period. In an embodiment, the creep rate of the refractory block 102 may be no greater than approximately $1.0 \times 10^{-4}$ h$^{-1}$, no greater than approximately $5.0 \times 10^{-5}$ h$^{-1}$, no greater than approximately $7.5 \times 10^{-6}$ h$^{-1}$, no greater than approximately $4.9 \times 10^{-6}$ h$^{-1}$, or no greater than approximately $1.01 \times 10^{-6}$ h$^{-1}$. In another embodiment, the creep rate of the refractory block 102 can be at least approximately $2.00 \times 10^{-6}$ h$^{-1}$, at least approximately $8.00 \times 10^{-6}$ h$^{-1}$, or at least approximately $1.00 \times 10^{-5}$ h$^{-1}$. In a particular embodiment, the creep rate is measured using a 4-point bending setup where the distance between the outer supports is approximately 80 mm while the inner supports are approximately 40 mm apart. An 8×9×100 mm surface ground bar of the material to test is placed on the bottom supports and a stress of approximately 2 MPa was applied through the top fixture. The test is conducted at a temperature of approximately 1275° C. for approximately 50 hours. The deflection of the bar as a function of time is recorded during the whole test, and the deformation of the bar is then calculated. In a particular embodiment, the Hollenberg model can be used to calculate the deformation of the bar from the deflection of the bar, as described in "Calculation of Stresses and Strains in Four Point Bending Creep Tests," by G. W. Hollenberg et al., J. Am. Ceram. Soc., Vol. 54, No 6, p 196-199 (1971).

The refractory block 102 can include grains having an averaged size no greater than approximately 500 micrometers, no greater than approximately 300 micrometers, or no greater than approximately 110 micrometers. In another embodiment, the grains of the refractory block 102 can include grains having an averaged size of at least approximately 10 micrometers, at least approximately 30 micrometers, or at least approximately 50 micrometers. The grain size is estimated from the observation of polished sections of the refractory block 102 and the measurement of the length (maximum dimension) and width (minimum dimension) of a large number of single grains (at least 100 grains randomly chosen). The averaged grain size can be determined using the widths, lengths, or a combination thereof, for example an average of the average width and average length (i.e., (average width+average length)/2) of the grains. In an embodiment, the averaged grain size can be based on an average of widths of the grains, an average of lengths of the grains, a median value corresponding to the width or the length, or the like. When comparing grain sizes, lengths of a sample are compared to the lengths of another sample or a prior art composition, widths of a sample are compared to the widths of another sample or a prior art composition, and a median value for grains of a sample are to be compared to the median values for grains of another sample or a prior art composition.

In another embodiment, size distributions can be determined from the data collected on the grains as previously described with respect to the average lengths and widths. As used herein, a D10 value represents the $10^{th}$ percentile, a D50 value represents the $50^{th}$ percentile, and a D90 value represents the $90^{th}$ percentile. Thus, D50 corresponds to the median value. In an embodiment where length is used as the basis of grain size, the D10, the D50 value, the D90 value, or a combination thereof, for the size of the grains of the refractory block 102 may be no greater than approximately 450 micrometers, no greater than approximately 300 micrometers, or no greater than approximately 150 micrometers. In an additional embodiment where length is used as the basis of grain size, the D10, the D50 value, the D90 value, or a combination thereof, for the size of the grains of the refractory block 102 is at least approximately 5 micrometers, at least approximately 20 micrometers, or at least approximately 50 micrometers.

The distribution of grain sizes within the sintered ceramic material can have a single mode or a plurality of modes, such as two, three, four, etc. In an embodiment, the sintered ceramic material can have a bimodal distribution of averaged grain sizes. In a particular embodiment, one of the modes can have an averaged grain size that is less than approximately 50%, less than approximately 40%, or less than approximately 30% of the averaged grain size of the other mode.

Furthermore, the refractory block 102 can have one or more phases, such as an aluminum phase and a silica phase. In a particular embodiment, substantially all of the aluminum of the refractory block 102 can be disposed in the aluminum phase. In another embodiment, when the refractory block 102 includes one or more additives, any one or more of the additives can be disposed within each of the aluminum phase and the silica phase. In an additional embodiment, substantially all of any one or more of the additives of the refractory block 102 can be disposed outside of the aluminum phase. In a more particular embodiment, substantially all of any one or more of the additives can be disposed within the silica phase. In a further embodiment, the silica phase is substantially uniformly dispersed throughout the aluminum phase within a body portion of the refractory block 102. In still another embodiment, the refractory block 102 includes a peripheral region disposed between an edge of the refractory block 102 and the body portion and outside of the body portion, where any portion of the peripheral region may be within no greater than approximately 20 mm of an edge of the refractory block 102, no greater than approximately 10 mm of the edge of the refractory object, no greater than approximately 5 mm of the edge of the refractory object, or no greater than approximately 1 mm of the edge of the refractory block 102.

In an embodiment, the silica phase includes an aluminum silicate, a magnesium silicate, a calcium silicate, a barium silicate, a strontium silicate, an yttrium silicate, or any combination thereof. In a particular embodiment, the refractory block 102 includes no greater than approximately 1.0 wt % of an alkali metal oxide (e.g. $Na_2O$, $K_2O$), no greater than approximately 0.5 wt % of the alkali metal oxide, no greater than approximately 0.3 wt % of the alkali metal oxide, no greater than approximately 0.3 wt % of the alkali metal oxide, or is substantially free of any alkali metal oxide. In a more particular embodiment, substantially all of the alkali metal oxide, if present, is within the silica phase. In a further embodiment, one or more additives disposed within the silica phase can affect the melting point of the silica phase. The melting point of the silica phase can be at least approximately 1300° C., at least approximately 1400° C., at least approximately 1500° C., at least approximately 1600° C., or at least approximately 1700° C. In another embodiment, the melting point of the silica phase is greater than at least approximately a sintering temperature used in forming the refractory object.

Figure 4:
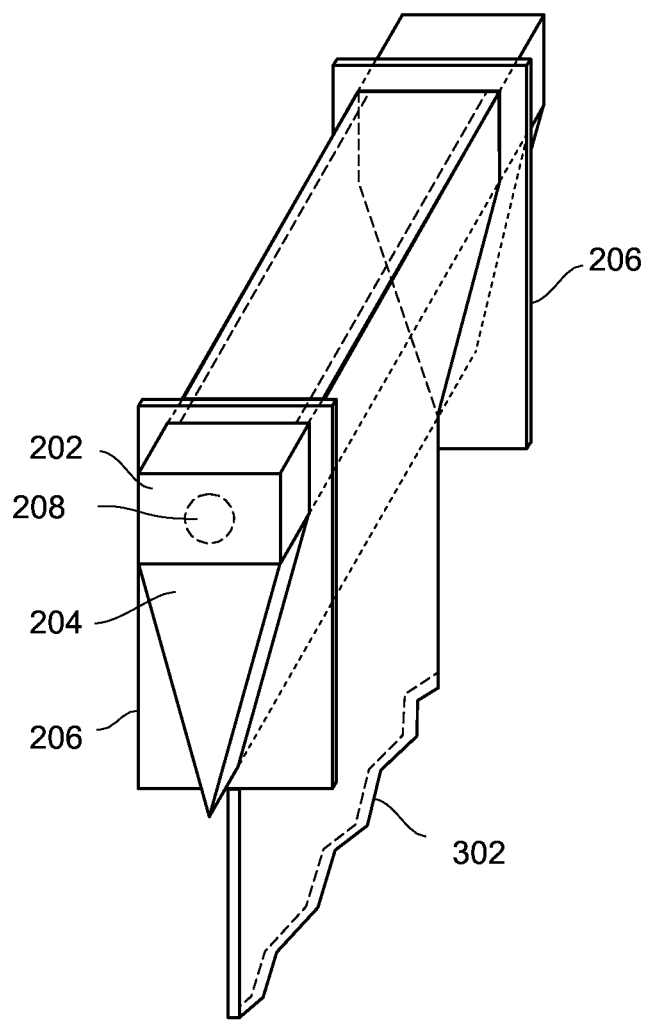
FIG. 4 is a diagram illustrating the formation of a particular glass sheet from the glass overflow trough.

The refractory block 102, when in the form of a glass overflow forming block, can be useful in forming a glass sheet by a fusion process. FIG. 4 includes a perspective view of the glass overflow forming block during the formation of a glass sheet 302. The glass overflow forming block is heated to a temperature in a range of approximately 1050 C to approximately 1300° C. The glass overflow forming block includes the glass overflow trough portion 202 and the tapered portion 204, as previously described. In the embodiment as illustrated, the glass overflow forming block also includes end guards 206 that generally define the width of the glass sheet 302 to be formed. The glass overflow forming block further includes an inlet port 208 that receives a molten glass composition. A trough within the glass overflow trough portion 202 receives the molten glass composition until the trough fills up. Thereafter, the molten glass composition flows over at least one of the lips of the glass overflow trough portion 202. The molten glass composition then flows along opposite outer surfaces of the glass overflow trough portion 202 and the tapered portion 204. At the end of the tapered portion 204 that is opposite the glass overflow trough portion 202, the molten glass composition along the opposite outer surfaces fuse together to form the glass sheet 302. In another embodiment, another type of glass object may be formed.

In an embodiment, the glass sheet 302 can have a thickness of at least approximately 20 micrometers, at least approximately 30 micrometers, or at least approximately 50 micrometers. In another embodiment, the glass sheet 302 may have a thickness no greater than approximately 5 mm, no greater than approximately 3 mm, or no greater than approximately 1.1 mm. With respect to the width, the process allows the end guards 206 to be set to permit any desired width of the glass sheet 302. For example, the glass sheet 302 can have a width of at least approximately 0.5 m, at least approximately 1.1 m, at least approximately 2.0 m, at least approximately 4.0 m, or larger.

Many different aspects and embodiments are possible. Some of those aspects and embodiments are described herein. After reading this specification, skilled artisans will appreciate that those aspects and embodiments are only illustrative and do not limit the scope of the present invention.

EXAMPLES

The concepts described herein will be further described in the following examples, which do not limit the scope of the invention described in the claims. Numerical values in this Examples section may be approximated or rounded off for convenience.

Refractory objects including a variety of different sintered ceramic materials are prepared using the process described previously and a number of starting materials, such as alumina powders, silica, particular additives, other materials, or a combination thereof. Tables 1 to 6 include the compositions of the samples, all of which are principally alumina containing. Trace levels of impurities may be present but are not reported, as such impurities typically do not significantly affect the performance of such samples. In addition, the total % of the components shown for each of the samples may not be 100% due to rounding.

The samples are tested to determine apparent porosity and a percentage of theoretical density as described previously. In addition, fracture toughness, 4-point creep rate, glass contact interface, blistering performance, or a combination thereof, are measured for particular samples shown in Table 7 according to the processes previously described.

Table 1 includes samples having MgO, CaO, $TiO_2$, or a combination thereof, as an additive. The starting materials for the samples include an amount of reactive $Al_2O_3$, an amount of non-reactive $Al_2O_3$, or both. For example, Samples 1, 2, and 3 are prepared with 94.00 wt % reactive $Al_2O_3$. In addition, Sample 4 is prepared with 24.63 wt % reactive $Al_2O_3$ and 73.89 wt % non-reactive $Al_2O_3$.

$MgTiO_3$ is added as a starting material for some samples shown in Table 1. For example, Sample 3 is prepared with 2.0 wt % $MgTiO_3$. The $MgTiO_3$ used to prepare Sample 16 of Table 1 includes 33.2 wt % MgO, 66.2 wt % $TiO_2$, and the remainder comprising amounts of $Al_2O_3$, $SiO_2$, $ZrO_2$, BaO, $Fe_2O_3$, $P_2O_5$, CaO, $Na_2O$, and $K_2O$. In addition, Sample 4 is prepared with 1.0 wt % MgO. Talc is also provided as a starting material for some samples in Table 1. To illustrate, Sample 1 is prepared with 6.0 wt % talc, Sample 2 is prepared with 5.0 wt % talc, and Sample 3 is prepared with 4.0 wt % talc. The talc used to prepare the Samples of Table 1 includes 74.86 wt % $Al_2O_3$, 24.7 wt % $SiO_2$, and a remainder including amounts of $TiO_2$, $Fe_2O_3$, CaO, MgO, $Na_2O$, $K_2O$, and $P_2O_5$.

TABLE 1

| Name | $Al_2O_3$ | $SiO_2$ | MgO | CaO | $TiO_2$ | Other | % Th. D | % porosity |
|---|---|---|---|---|---|---|---|---|
| Sample 1 | 93.81 | 3.23 | 1.83 | 0.23 | 0.60 | 0.13 | 92 | 0.00 |
| Sample 2 | 93.81 | 2.70 | 1.86 | 0.20 | 1.16 | 0.12 | 90 | 0.22 |

TABLE 1-continued

| Name | $Al_2O_3$ | $SiO_2$ | MgO | CaO | $TiO_2$ | Other | % Th. D | % porosity |
|---|---|---|---|---|---|---|---|---|
| Sample 3 | 93.81 | 2.16 | 1.90 | 0.17 | 1.72 | 0.11 | 90 | 0.31 |
| Sample 4 | 98.10 | 0.01 | 1.00 | 0.01 | 0.49 | 0.25 | 83 | 16.44 |

Table 2 includes samples having $TiO_2$, $Ta_2O_5$, or a combination thereof, as an additive. The starting materials for the samples include an amount of reactive $Al_2O_3$, an amount of non-reactive $Al_2O_3$, or both. For example, Sample 5 is prepared with 19.99 wt % reactive $Al_2O_3$ and 64.01 wt % non-reactive $Al_2O_3$, Sample 6 is prepared with 19.99 wt % reactive $Al_2O_3$ and 59.01 wt % non-reactive $Al_2O_3$, and Sample 7 is prepared with 19.99 wt % reactive $Al_2O_3$ and 59.01 wt % non-reactive $Al_2O_3$.

Furthermore, Samples 5, 6, and 7 are prepared with an amount of mullite. To illustrate, Sample 5 is prepared with 15.0 wt % mullite, and Samples 6 and 7 are prepared with 20.0 wt % mullite. The mullite used to prepare Samples 5 and 6 is CE Minerals Mullite 70-325 including 67.39 wt % $Al_2O_3$, 28.38 wt % $SiO_2$, 2.7 wt % $TiO_2$, 1.10 wt % $Fe_2O_3$, and a remainder comprised of CaO, MgO, $Na_2O$, $K_2O$, and $P_2O_5$. The mullite used to prepare Sample 7 is Duramul 325/F Mullite including 74.86 wt % $Al_2O_3$, 24.70 wt % $SiO_2$, and a remainder comprised of $TiO_2$, $Fe_2O_3$, CaO, MgO, $Na_2O$, $K_2O$, and $P_2O_5$. Additionally, Samples 5, 6, and 7 are prepared with 1 wt % $Ta_2O_5$ and Sample 27 is prepared with 0.9 wt % $Ta_2O_5$.

TABLE 2

| Name | $Al_2O_3$ | $SiO_2$ | $TiO_2$ | $Ta_2O_5$ | Other | % Th. D | % porosity |
|---|---|---|---|---|---|---|---|
| Sample 5 | 93.75 | 4.27 | 0.41 | 1.00 | 0.42 | 95 | 0.20 |
| Sample 6 | 92.14 | 5.69 | 0.55 | 1.00 | 0.47 | 95 | 0.20 |
| Sample 7 | 93.64 | 4.95 | 0.01 | 1.00 | 0.29 | 92 | 0.40 |

Table 3 includes samples having $Y_2O_3$ as an additive. The starting materials for the samples include an amount of reactive $Al_2O_3$, an amount of non-reactive $Al_2O_3$, or both. For example, Samples 8, 9, and 10 are prepared with 94.00 wt % reactive $Al_2O_3$. Additionally, Sample 11 is prepared with 19.98 wt % reactive $Al_2O_3$ and 65.03 wt % non-reactive $Al_2O_3$.

Furthermore, Sample 11 is prepared with an amount of mullite. To illustrate, Sample 11 is prepared with 12.0 wt % mullite. The mullite used to prepare Sample 11 is Duramul 325/F Mullite including 74.86 wt % $Al_2O_3$, 24.70 wt % $SiO_2$, and a remainder comprised of $TiO_2$, $Fe_2O_3$, CaO, MgO, $Na_2O$, $K_2O$, and $P_2O_5$.

Sample 8 is prepared with 6 wt % $Y_2O_3$, Sample 9 is prepared with 4 wt % $Y_2O_3$, Sample 10 is prepared with 5 wt % $Y_2O_3$, and Sample 11 is prepared with 3 wt % $Y_2O_3$. Further, Sample 8 is prepared with 2.0 wt % amorphous $SiO_2$ and Sample 9 is prepared with 1.0 wt % crystalline $SiO_2$.

TABLE 3

| Name | $Al_2O_3$ | $SiO_2$ | $Y_2O_3$ | $TiO_2$ | Other | % Th. D | % porosity |
|---|---|---|---|---|---|---|---|
| Sample 8 | 93.81 | 0.02 | 6.00 | 0.00 | 0.16 | 86 | 12.53 |
| Sample 9 | 93.83 | 1.99 | 4.00 | 0.00 | 0.16 | 92 | 0.28 |

TABLE 3-continued

| Name | $Al_2O_3$ | $SiO_2$ | $Y_2O_3$ | $TiO_2$ | Other | % Th. D | % porosity |
|---|---|---|---|---|---|---|---|
| Sample 10 | 93.82 | 1.01 | 5.00 | 0.00 | 0.16 | 94 | 0.20 |
| Sample 11 | 93.62 | 2.98 | 3.00 | 0.01 | 0.28 | 94 | 0.21 |

Table 4 includes samples having $ZrO_2$. The starting materials for the samples include an amount of reactive $Al_2O_3$. For example, Sample 12 is prepared with 92.50 wt % reactive $Al_2O_3$, and Sample 13 is prepared with 92.00 wt % reactive $Al_2O_3$. Additionally, Sample 12 is prepared with 1.5 wt % $MgTiO_3$ and 6.0 wt % talc. Sample 13 is prepared with 3.0 wt % $ZrO_2$, 3.0 wt % $Ta_2O_5$, 1.0 wt % $Y_2O_3$, and 2.0 wt % crystalline $SiO_2$. The talc used to prepare Sample 12 of Table 4 includes 74.86 wt % $Al_2O_3$, 24.7 wt % $SiO_2$, and a remainder including amounts of $TiO_2$, $Fe_2O_3$, CaO, MgO, $Na_2O$, $K_2O$, and $P_2O_5$. The $MgTiO_3$ used to prepare Sample 12 of Table 4 includes 33.2 wt % MgO, 66.2 wt % $TiO_2$, and the remainder comprising amounts of $Al_2O_3$, $SiO_2$, $ZrO_2$, BaO, $Fe_2O_3$, $P_2O_5$, CaO, $Na_2O$, and $K_2O$.

TABLE 4

| Name | $Al_2O_3$ | $SiO_2$ | MgO/$TiO_2$ | $Y_2O_3$/$Ta_2O_5$ | $ZrO_2$ | Other | % Th. D | % porosity |
|---|---|---|---|---|---|---|---|---|
| Sample 12 | 92.33 | 2.03 | 0.55/1.00 | 0.00/0.00 | 3.92 | 0.09 | 94 | 3.10 |
| Sample 13 | 91.83 | 2.00 | 0.06/0.00 | 1.00/2.00 | 2.99 | 0.10 | 92 | 3.80 |

Table 5 includes samples having $TiO_2$, $Fe_2O_3$, or any combination thereof. The starting materials for the samples include an amount of reactive $Al_2O_3$, an amount of non-reactive $Al_2O_3$, or both. For example, Sample 18 is prepared with 78.00 wt % reactive $Al_2O_3$. Additionally, Sample 15 is prepared with 19.98 wt % reactive $Al_2O_3$ and 59.32 wt % non-reactive $Al_2O_3$, Sample 16 is prepared with 23.81 wt % reactive $Al_2O_3$ Sample 17 is prepared with 19.88 wt % reactive $Al_2O_3$ and 59.64 wt % non-reactive $Al_2O_3$, and Sample 14 is prepared with 19.88 wt % reactive $Al_2O_3$ and 59.64 wt % non-reactive $Al_2O_3$.

Furthermore, Samples 14, 15, 16, and 17 are prepared with mullite. In particular, Sample 14 is prepared with 19.9 wt % mullite. In addition, Sample 15 is prepared with 20.0 wt % mullite, Sample 16 is prepared with 4.8 wt % mullite, and Sample 17 is prepared with 19.9 wt % mullite. The mullite used to prepare Sample 14 is CE Minerals/Treibacher WFM Mullite including 76.00 wt % $Al_2O_3$, 23.50 wt % $SiO_2$, and a remainder comprised of $Fe_2O_3$, CaO, MgO, $Na_2O$, and $K_2O$. The mullite used to prepare Samples 15 and 16 is Duramul 325/F Mullite including 74.86 wt % $Al_2O_3$, 24.70 wt % $SiO_2$, and a remainder comprised of $TiO_2$, $Fe_2O_3$, CaO, MgO, $Na_2O$, $K_2O$, and $P_2O_5$. The mullite used to prepare Sample 17 is CE Minerals Mullite 70-325 including 67.39 wt % $Al_2O_3$, 28.38 wt % $SiO_2$, 2.7 wt % $TiO_2$, 1.10 wt % $Fe_2O_3$, and a remainder comprised of CaO, MgO, $Na_2O$, $K_2O$, and $P_2O_5$. Additionally, Sample 14 is prepared with 0.6 wt % $TiO_2$, Sample 47 is prepared with 0.5 wt % $TiO_2$, and Sample 17 is prepared with 0.6 wt % $TiO_2$.

TABLE 5

| Name | $Al_2O_3$ | $SiO_2$ | $TiO_2$ | $Fe_2O_3$ | Other | % Th. D | % porosity |
|---|---|---|---|---|---|---|---|
| Sample 14 | 94.29 | 4.68 | 0.60 | 0.02 | 0.28 | 93 | 0.34 |
| Sample 15 | 93.94 | 4.95 | 0.51 | 0.21 | 0.28 | 93 | 0.30 |
| Sample 16 | 98.40 | 1.19 | 0.00 | 0.01 | 0.27 | 83 | 12.34 |
| Sample 17 | 92.58 | 5.65 | 1.14 | 0.23 | 0.24 | 94 | 0.80 |
| Sample 18 | 94.31 | 5.45 | 0.01 | 0.02 | 0.18 | 91 | 6.20 |

TABLE 6

| Name | Creep Rate (4 pts bending) ($h^{-1}$) | Glass Contact Interface (tight/loose) | Blistering Performance (low/high) | K1C Indentation ($MPa/m^{1/2}$) |
|---|---|---|---|---|
| Sample 1 | | tight | low | 2.57 |
| Sample 2 | $2.93 \times 10{-5}$ | | | 1.89 |
| Sample 5 | $5.59 \times 10{-6}$ | | low | |
| Sample 6 | $1.50 \times 10{-5}$ | tight | low | 2.27 |
| Sample 7 | $1.50 \times 10{-5}$ | tight | low | 2.49 |
| Sample 9 | $1.20 \times 10{-6}$ | tight | low | 2.09 |
| Sample 11 | $2.40 \times 10{-6}$ | | low | |
| Sample 15 | | | low | |
| Sample 18 | $3.70 \times 10{-6}$ | tight | high | |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or other features that are inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the embodiments of the disclosure. This description should be read to include one or at least one and the singular also includes the plural, or vice versa, unless it is clear that it is meant otherwise. The term "averaged," when referring to a value, is intended to mean an average, a geometric mean, or a median value. Group numbers corresponding to columns within the Periodic Table of the elements use the "New Notation" convention as seen in the CRC Handbook of Chemistry and Physics, 81st Edition (2000-2001).

Unless otherwise defined, all technical and scientific terms used herein have the same meaning as commonly understood by one of ordinary skill in the art to which this disclosure belongs. The materials, methods, and examples are illustrative only and not intended to be limiting. To the extent not described herein, many details regarding specific materials and processing acts are conventional and may be found in textbooks and other sources within the refractory objects and glass overflow trough arts.

The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A refractory object comprising:
    $Al_2O_3$ at a content in a range of 70 wt % $Al_2O_3$ to 94 wt % $Al_2O_3$;
    $SiO_2$ at a content of at least 1.1 wt % and not greater than 7 wt % $SiO_2$; and
    an additive at a content of at least 0.2 wt % additive, wherein the additive includes SrO, $Ta_2O_5$, ZnO, or any combination thereof; and
    wherein a creep rate of the refractory object is no greater than $1 \times 10^{-4}$ $h^{-1}$ and an apparent porosity of the refractory object is not greater than 0.5 vol % for a total volume of the refractory object.

2. The refractory object as recited in claim 1, wherein the creep rate of the refractory object is no greater than $5.0 \times 10^{-5}$ $h^{-1}$.

3. The refractory object as recited in claim 2, wherein the creep rate of the refractory object is at least $1 \times 10^{-6}$ $h^{-1}$.

4. The refractory object as recited in claim 1, wherein the percentage of the theoretical density of the refractory object is no greater than 95%.

5. The refractory object as recited in claim 1, wherein the percentage of the theoretical density of the refractory object is at least 91%.

6. A refractory object comprising:
    $Al_2O_3$ at a content in a range of 70 wt % $Al_2O_3$ to 94 wt % $Al_2O_3$;
    $SiO_2$ at a content of at least 1.1 wt % and not greater than 7 wt % $SiO_2$;
    an additive at a content of at least 0.2 wt % additive, wherein the additive includes SrO, $Ta_2O_5$, ZnO, or any combination thereof;
    an aluminum phase;
    a silica phase; and
    wherein the silica phase is substantially uniformly dispersed throughout the aluminum phase within a body portion of the refractory object and
    an apparent porosity of the refractory object is not greater than 0.5 vol % for a total volume of the refractory object.

7. The refractory object as recited in claim 6, wherein the refractory object includes no greater than 8 wt % of the additive.

8. The refractory object as recited in claim 7, wherein the silica phase includes an aluminum silicate, a strontium silicate, or any combination thereof.

9. The refractory object as recited in claim 7, wherein the refractory object includes no greater than 1 wt % of an alkali metal oxide.

10. The refractory object as recited in claim 6, wherein at least 16% of the $Al_2O_3$ in the refractory object is provided as reactive $Al_2O_3$.

11. The refractory object as recited in claim 10, wherein no greater than 99% of the $Al_2O_3$ in the refractory object is provided as reactive $Al_2O_3$.

12. The refractory object as recited in claim 6, wherein the refractory object comprises no greater than 0.3 wt % $ZrO_2$.

13. The refractory object as recited in claim 12, wherein the refractory object comprises at least 0.03 wt % $ZrO_2$.

14. The refractory object as recited in claim 6, wherein the refractory object comprises at least 85 wt % $Al_2O_3$.

15. The refractory object as recited in claim 14, wherein the refractory object includes no greater than 93 wt % $Al_2O_3$.

16. The refractory object as recited in claim 6, wherein a fracture toughness of the refractory object is at least 2.1 $MPa\text{-}m^{1/2}$.

\* \* \* \* \*